Inventor
Robert C. Odell
by Houston L. Swenson
Attorney

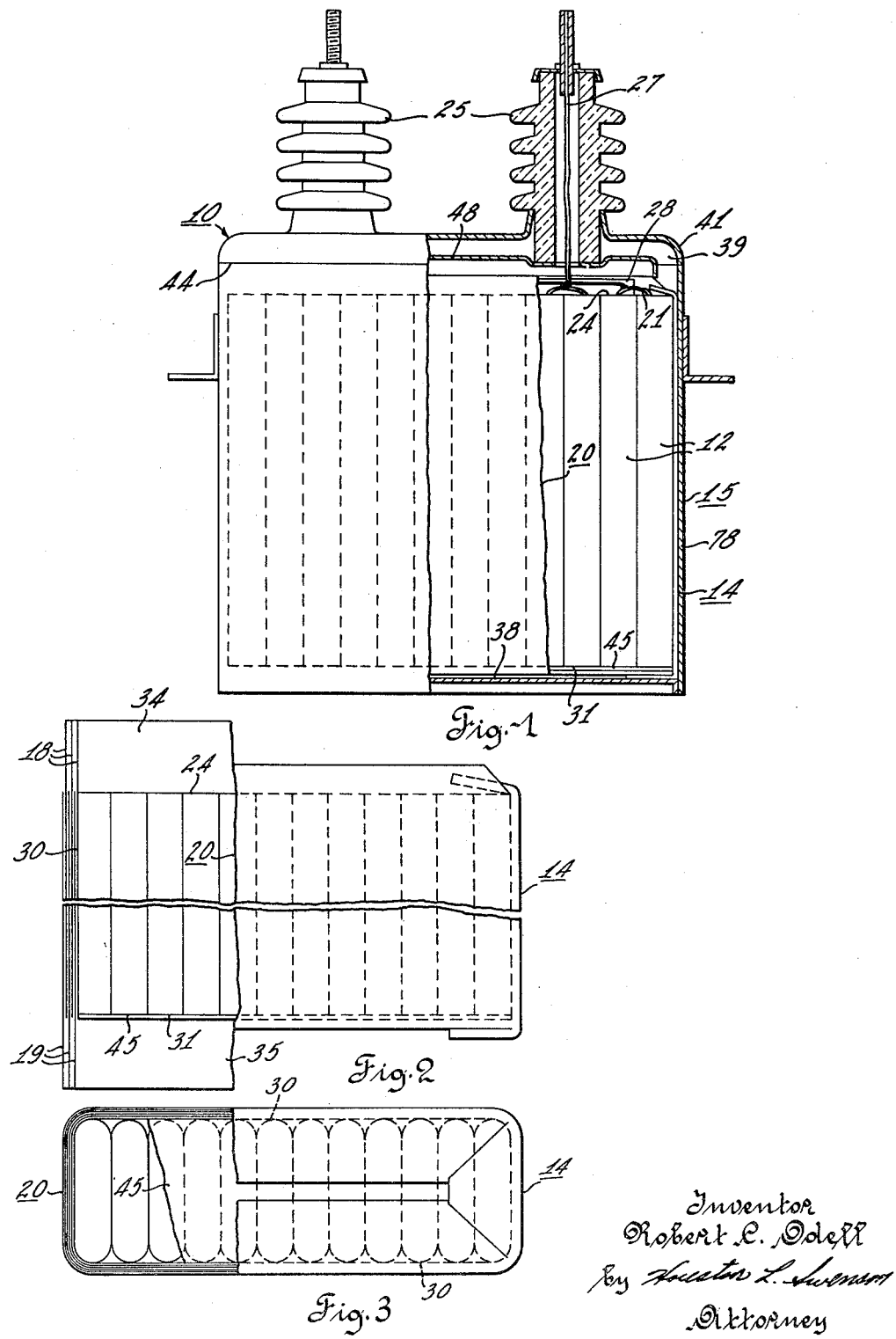

3,108,413
METHOD OF APPLYING MAJOR INSULATION FOR CAPACITORS
Robert C. Odell, New Berlin, Wis., assignor to Allis-Chalmers Manufacturing Company, Milwaukee, Wis.
Original application Apr. 24, 1958, Ser. No. 730,571, now Patent No. 2,986,680, dated May 30, 1961. Divided and this application Jan. 19, 1961, Ser. No. 83,767
5 Claims. (Cl. 53—24)

This invention relates in general to capacitors. More specifically this invention relates to a new method for winding major insulation on capacitors. This is a division of my pending application, Serial No. 730,571 filed on April 24, 1958, now Patent No. 2,986,680.

Capacitors for power factor correction and for other purposes that require large amounts of reactive volt amperes at high voltages are usually made up of a number of individual capacitor elements or packs that are immersed in a liquid dielectric in a sealed container. Each pack is itself a capacitor and has two aluminum foils and several insulating tissues wound together.

The reactive volt ampere rating of a capacitor depends for the most part on the capacitance of the packs. To obtain a high capacitance it is desirable to provide a large foil area, to space the two foils of each pack very close together and to use a liquid dielectric that has a high dielectric constant. The insulating tissues between the two foils are very thin to allow close spacing of the foils, and the foils are very thin to allow a large surface area of foil to be placed in the container. One of the advantages of making a capacitor of a number of small capacitor packs is that the individual packs can be flattened so that many packs can be placed in a can of minimum volume. To further increase the capacitance of the packs, the assembly of packs is compressed before being placed in the container. Compressing the assembly of packs allows more foil to be used and also decreases the distance between the two foils of each pack.

The close spacing of the foils which is desirable for a high capacitance rating makes the individual packs unsuited for operating at high voltages. For example, to obtain a high capacitance the packs may be insulated for only a few hundred volts, yet power capacitors are often required to operate at several thousand volts. Consequently, the packs are usually connected partly in series so that the voltage across the capacitor is distributed among the series of packs and the voltage difference between the foils of one pack is only a fraction of the voltage across the capacitor. Although very thin insulation between the two foils of a pack is adequate when the voltage between the foils of the individual packs is reduced by the series connection, most of the foils in the assembly are at a high potential above ground. Consequently, additional insulation is required between the packs and the container to insulate the assembly of the capacitor packs from ground. This additional insulation around the assembly is called major insulation to distinguish it from the insulation between the foils.

Preferably the major insulation consists for the most part of a number of layers of medium thickness insulating paper. This paper is less expensive than the tissue paper used between foils and has better insulating strength than a single heavy paper section of the same total thickness. The paper is usually wrapped around the exposed sides of the packs and folded over the tops and bottoms of the assembled packs. However, in capacitors of the known prior art a problem exists in applying the major insulation and at the same time compressing the assembly of packs. For example, some capacitors of the prior art have used a large number of individual sheets of paper that are arranged in two groups at opposite sides of the assembly to allow the packs to be compressed between the two groups of paper. When the assembly is compressed, the individual sheets of paper can be folded into place. The sheets must be prearranged in each group so that the joints where opposite sheets come together are overlapped by other sheets to provide a continuous insulating surface. Furthermore, when the paper is folded over the top and bottom of the assembly, double and triple thicknesses of insulating material build up at the corners. As a practical matter less insulation may actually be needed at the top and bottom of the assembled packs than along the sides because the individual packs are often constructed with the insulating tissues extending somewhat past the ends of the foils to prevent the ends of the foils from contacting each other. The insulating space at the ends of such packs is, therefore, greater than the insulating space along the sides. Unnecessary insulation at the folds of the material not only wastes space in the container but also impedes the transfer of heat from the packs to the walls of the container and thereby reduces the reactive volt ampere rating of the capacitor. Both the problem of unnecessary insulation at the folds and the problem of compressing the assembly to apply the insulation are more pronounced in capacitors for higher voltage than for lower voltage capacitors because more layers of insulation are required. Furthermore, in higher voltage capacitors the folds at the tops and bottoms of the packs are not only heavier and more space consuming; but since more layers of paper are used, there is more physical stress in the heavy folds at the corners, and the paper is liable to tear.

In the method of this invention the exposed sides of the assembled packs may be insulated by two or more continuous strips of insulating material which are wound around the sides of the assembly. The strips may be staggered so that one strip extends past the top of the assembly and another strip extends past the bottom of the assembly. The extending portions of the insulation have fewer layers of insulation than the portion of insulation along the sides of the assembly. Consequently, when the material is folded over the top and bottom of the assembly, the resulting insulation is substantially smooth even in the corners where two or three thicknesses of the total insulation exists. The top and bottom of the insulated assembly are substantially flat and allow close spacing of the assembly in the container. Therefore, this capacitor has an improved space factor and better heat transfer from the packs to the container. This insulation can be applied to the packs rapidly by placing the pack assembly in a pressing clamp and revolving the clamp to wind the staggered sheets of material around the packs and the clamp. The clamp is sufficiently thin so that the compressed packs expand to fill out all the space within the major insulation after the clamp is removed from the insulated assembly. This method of applying the insulation provides for either staggering or aligning the sheets of insulating material, and it eliminates a problem of the prior art of cutting and fitting together a number of insulating sections.

Therefore, it is an object of this invention to provide a new and improved capacitor.

Another object of this invention is to provide a simpler and more economical method for applying capacitor major insulation.

Another object of this invention is to provide a new and improved method for applying major insulation to capacitors in which the positioning of the insulation material with respect to the pack assembly is simplified.

Other objects and advantages of this invention will be apparent from the following description when read in connection with the following drawings in which:

FIG. 1 is a side elevation partly in section of the capacitor of this invention;

FIG. 2 is a side elevation of the insulated assembly of capacitor packs;

FIG. 3 is a bottom view of FIG. 2; and

Figure 4:
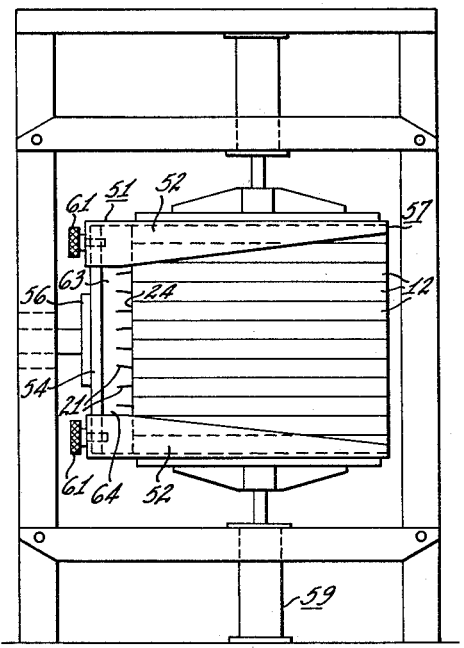
FIGS. 4 through 7 illustrate successive steps in applying the insulation to the assembly of capacitor packs.

A capacitor 10, as shown in FIGS. 1, 2 and 3, has a plurality of packs 12 forming an assembly 14. The assembly 14 is disposed in a container 15 and is insulated from the container by two strips of paper 18 and 19 that form the major insulation 20 of this invention. The packs 12 may be of any suitable construction. Preferably the packs are made of aluminum foils and intervening strips of insulating tissue which are wound together. The packs 12 are flattened and are disposed side to side in the container 15. Metal tabs 21 protrude from the top 24 of each pack 12 for interconnecting the packs electrically. As previously explained, the packs 12 may be connected partly in series to increase the voltage rating of the capacitor. Bushings 25 are positioned for bringing out leads 27 from the assembly 14. A resistance means 28 is connected between the bushing leads 27 or between tabs 21 for discharging the packs when the capacitor is disconnected from its electrical system. As shown in FIGS. 2 and 3, the two sheets of insulating paper 18 and 19 are wound around the exposed sides 30 of the packs 12 in the assembly 14. One of the sheets 18 covers the sides 30 of the assembly and extents past the top 24 of the assembly. The other sheet 19 covers the sides 30 of the assembly and extends past the bottom 31 of the assembly. The two sheets 18 and 19 of paper are wound around the sides of the assembly for the desired number of turns. For illustration three turns of the two sheets 18 and 19 are shown. However, it will be understood that any number of turns may be used. The extending portion 34 of the sheet 18 is folded over the top of the assembly and the extending portion 35 of the sheet 19 is folded over the bottom of the assembly. Since the portions 34 and 35 have only a few layers of paper relative to the layers on the sides, the insulation at the top and the bottom of the assembly is substantially flat even near the corners where double and triple thicknesses exist. Furthermore, since there are only a few layers at the folds, and since each of the layers in a fold is spaced apart by layers of the other sheet, the folds along the edges are smooth and do not physically stress the paper.

As is indicated in FIG. 1, the assembly 14 fits closely against the bottom 38 of the container 15 but a space 39 is provided between the packs 12 and the top section 41 of the container. The space 39 separates the assembly 14 from the seam 44 to prevent damage to the packs when the seam is welded. The space 39 also allows the bushings 25 to extend into the container 15 for a proper creep distance and provides space for the electrical connections at the tops of the packs.

Although the insulation at the bottom of the assembly may consist exclusively of the folded portions 35, it is advantageous in some capacitors to bridge the edges of the folded portions with an additional insulating section 45. The insulating section 45 may be a pad made of several layers of paper similar to the paper used along the sides of the assembly. Since the assembly 14 is spaced from the top 41 of the container 15, there will ordinarily be no need to provide additional insulation similar to the pad 45 at the top of the assembly. As is shown in FIG. 1 and FIG. 2, the portion 34 of the insulation fits compactly against the assembly of packs but lies at a slight angle with respect to the tops of the packs in order to provide space for the tabs 21 and the resistance means 28. A spacer 48, which is illustrated as a preformed paper covering for the packs, is placed between the top 24 of the packs and the top section 41 of the container to keep the insulation away from the seam 44 while the seam is welded and to prevent the assembly of packs from shifting position if the capacitor is mounted on its side.

It is not necessary to use two sheets of paper in the insulation, and other ratios of the thickness of the material at the top and bottom of the assembly to the thickness at the sides are possible when additional sheets are used. For example, if a third sheet is used which does not extend past either the top or the bottom of the assembly, the insulation at the top and bottom will have one-third the number of layers of paper of the sides of the assembly.

The new and improved method of applying major insulation provides for compressing the assembly and winding the insulating material on the compressed assembly. This method of applying insulation also provides a simple way to stagger the sheets of insulation for applying fewer layers of insulation at the top and bottom of the assembly. However, this method may be adapted for capacitors which do not require the advantages of the staggered insulation.

Figure 5:
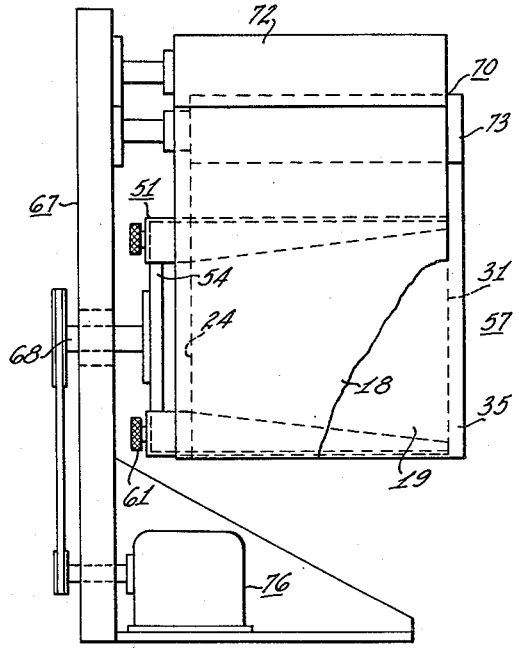
Figure 6:
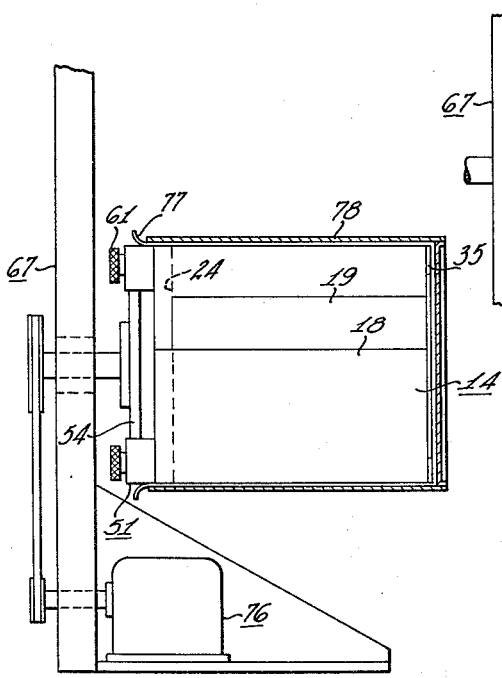
Figure 7:
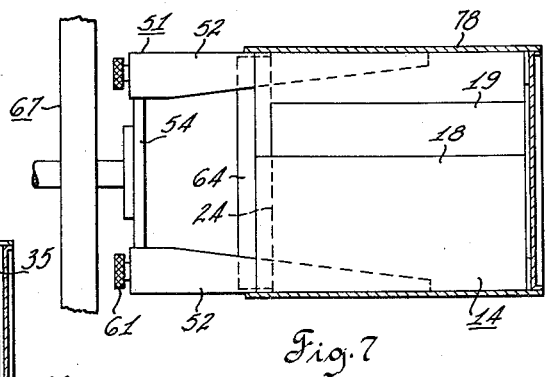

As shown in FIG. 4, the packs 12 are first assembled in a pressing clamp 51. The clamp 51 has side members 52 for grasping the assembly of the packs and a connecting member 54 located at one end 56 of the clamp. The remaining end 57 of the clamp 51 is open so that the pack assembly may be removed from the clamp after the clamp and the insulated assembly of packs are placed in the container. The side members 52 are sufficiently thin so that when the clamp 51 is withdrawn from the container 15 the resilient packs 12 fill up the space in the container previously taken by the side members. Preferably the side members 52 are partly curved around the adjacent pack to form a rigid channel. The packs 12 are pressed together in the clamp 51 by any suitable means 59. When the packs 12 have been compressed sufficiently, the side members 52 are locked in position on the connecting member 54 by any suitable means such as by bolts 61 joining the side members 52 to the connecting member 54, and the clamp 51 is removed from the press 59. For applying the major insulation to a capacitor of the type shown in FIG. 1, the packs 12 are aligned with the tabs 21 at the tops of the packs toward the closed end 56 of the clamp 51. Preferably a space 63 is provided between the top of the assembly 14 and the connecting member 54 of the clamp 51 to facilitate removing the clamp from the assembly. A block 64 may be placed between the top of the packs and the connecting members of the clamp to assist later in separating the capacitor from the clamp. When the side members 52 of the clamp 51 have been locked in position, the clamp is mounted in a winding lathe 67 by means of an arbor 68 attached to the connecting member 54 of the clamp as is shown in FIG. 5. A supply 70 of insulating paper is mounted near the winding lathe 67. As illustrated, two rolls of paper 72 and 73 are provided. One roll 72 is positioned to form the insulating sheet 18 that extends past the top 24 of the packs and the other roll 73 is offset from the roll 72 to form the sheet 19 that extends past the bottom 31 of the packs. The sheets of insulation 18, 19 may be attached to the pack assembly in any suitable way to start the winding. A driving means 76 is provided for turning the lathe 67 to wind the insulation onto the clamped assembly. The insulation may be wound about the assembly rapidly and tightly. When the desired number of turns have been wound on the capacitor, the sheets of insulation 18 and 19 are separated from the rolls of paper 72 and 73. If desired, additional insulation may now be placed against the bottom 31 of the packs 12 at the open end 57 of the clamp 51. The extending portion 35 of the insulation sheet 19 at the bottom of the assembly is folded along the edges and corners of the clamped assembly, as is shown in FIG. 6. The insulating portion 35 should be held in the folded position by any suitable means until the assembly is in place in the container. As illustrated in FIG. 6, a narrow strip of paper 77 is passed over the bottom 31 of the assembly. The lower section 78 of the container is then placed over the clamped assembly. The insulation at the bottom of the assembly prevents the major insulation from sliding off the packs as the packs are placed in the container. The paper holding strip may be left in the container, or if desired it may be pulled out easily. The clamp locking bolts 61 are released and the clamp 51 is withdrawn from the lower section of the container 15, as is shown in FIG. 7. If the block 64 has been previously placed against the top of the packs, the clamp may be removed readily by exerting force between the block and the clamp.

Electrical connections and other steps necessary before completing the assembly of insulation are now made. Usually these steps include interconnecting groups of tabs, attaching bushing leads to some of the tabs and connecting the resistances across the pack or bushing terminals. When these steps have been completed, the portion 34 of the insulation extending past the tops of the packs is folded over along the edges and corners of the top of the assembly. A spacer similar to the paper section that is preformed to fit the bushings and the tabs may then be placed over the end of the assembly and the upper section 41 of the container may be sealed to the lower section.

It will be obvious to those skilled in the art that variations may be made without departing from the scope of the appended claims.

What is claimed is:

1. The method of applying major insulation to a plurality of capacitor packs arranged in juxtaposition and cooperating to form an assembly having continuous sides and similar top and bottom surfaces comprising the steps of compressing said assembly along its line of juxtaposition, applying and maintaining a clamping force on two opposed sides of said assembly along the line of juxtaposition, said opposed sides being defined by the two exterior juxtaposed packs, revolving said clamped assembly to wind a sheet of insulation around all of said sides of said assembly, and unclamping said assembly.

2. The method of applying major insulation to a plurality of capacitor packs arranged in juxtaposition and cooperating to form an assembly having continuous sides and similar top and bottom surfaces comprising the steps of compressing said assembly along its line of juxtaposition, applying and maintaining a clamping force on two opposed sides of said assembly along the line of juxtaposition, said opposed sides being defined by the two exterior juxtaposed packs, revolving said clamped assembly to wind an oversize sheet of insulation around all of said sides of said assembly, folding some of said insulation over said bottom of said assembly, unclamping said assembly, and folding some of said insulation over said top of said assembly.

3. The method of applying major insulation to a plurality of capacitor packs arranged in juxtaposition and cooperating to form an assembly having continuous sides and similar top and bottom surfaces comprising the steps of compressing said assembly along its line of juxtaposition, applying and maintaining a clamping force on two opposed sides of said assembly along the line of juxtaposition, said opposed sides being defined by the two exterior juxtaposed packs, revolving said clamped assembly to wind a pair of staggered and oversize sheets of insulation around all of said sides of said assembly, folding some of said insulation over said bottom of said assembly, unclamping said assembly, and folding some of said insulation over said top of said assembly.

4. The method of applying major insulation to a plurality of capacitor packs arranged in juxtaposition and cooperating to form an assembly having continuous sides and similar top and bottom surfaces comprising the steps of compressing said assembly along its line of juxtaposition, applying and maintaining a clamping force on two opposed sides of said assembly along the line of juxtaposition, said opposed sides being defined by the two exterior juxtaposed packs, revolving said clamped assembly to wind oversize sheets of insulation around all of said sides of said assembly with portions of said insulation extending past said top and bottom surfaces, folding said bottom extending insulation over said bottom of said assembly, unclamping said assembly, and folding said top extending insulation over said top of said assembly.

5. The method of applying major insulation to a plurality of capacitor packs arranged in juxtaposition and cooperating to form an assembly having continuous sides and similar top and bottom surfaces comprising the steps of compressing said assembly along its line of juxtaposition, applying and maintaining a clamping force on two opposed sides of said assembly along the line of juxtaposition, said opposed sides being defined by the two exterior juxtaposed packs, revolving said clamped assembly to wind a plurality of layers of a pair of parallel and staggered oversize sheets of insulation around all of said sides of said assembly, folding said layers extending past said bottom of said assembly over said bottom, unclamping said assembly, and folding said layers extending past said top of said assembly over said top.

References Cited in the file of this patent

UNITED STATES PATENTS 965,317    Nyberg _____ July 26, 1910